(12) United States Patent
Noyes

(10) Patent No.: US 9,280,254 B2
(45) Date of Patent: Mar. 8, 2016

(54) METHOD OF SYNCHRONIZING MULTIPLE VIEWS OF MULTIPLE DISPLAYED DOCUMENTS

(75) Inventor: Peter Noyes, Pasadena, CA (US)

(73) Assignee: Bluebeam Software, Inc.

( * ) Notice: Subject to any disclaimer, the term of this patent is extended or adjusted under 35 U.S.C. 154(b) by 1764 days.

(21) Appl. No.: 12/018,011

(22) Filed: Jan. 22, 2008

(65) Prior Publication Data

US 2009/0187853 A1    Jul. 23, 2009

(51) Int. Cl.
*G09G 5/14* (2006.01)
*G06F 3/0481* (2013.01)
*G06F 17/21* (2006.01)
*G06F 3/14* (2006.01)

(52) U.S. Cl.
CPC ............. *G06F 3/0481* (2013.01); *G09G 5/14* (2013.01); *G06F 3/1431* (2013.01); *G06F 3/1438* (2013.01); *G06F 17/211* (2013.01); *G06F 2203/04803* (2013.01); *G06F 2203/04806* (2013.01); *G09G 2340/12* (2013.01)

(58) Field of Classification Search
CPC ........ G06F 3/0481; G06F 17/211; G09G 5/14
USPC .................... 715/802, 815, 788, 827
See application file for complete search history.

(56) References Cited

U.S. PATENT DOCUMENTS

| 7,036,089 | B2* | 4/2006 | Bauer | G06F 3/0481 715/789 |
| 7,779,365 | B2* | 8/2010 | Fujita | G06F 3/0481 715/788 |

* cited by examiner

*Primary Examiner* — Sherrod Keaton
(74) *Attorney, Agent, or Firm* — Stetina Brunda Garred & Brucker

(57) ABSTRACT

There is provided a method of synchronizing multiple views of multiple displayed documents. The method includes displaying a first document in a first viewing window. The method includes displaying a second document in a second viewing window. The method includes determining from the viewing windows an active window. The method includes determining for the active window a scale value and an offset value associated with the display of the associated one of the documents. The method includes redisplaying each document associated with the viewing window that is not the active window by using the determined scale and offset values.

11 Claims, 8 Drawing Sheets

METHOD OF SYNCHRONIZING MULTIPLE VIEWS OF MULTIPLE DISPLAYED DOCUMENTS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates to the displaying of documents upon a graphic user interface, more particularly, to a method of synchronizing multiple views of multiple displayed documents.

2. Description of the Related Art

A topic of interest is graphic user interfaces that allow users to interact with a computer via one or more windows displayed upon a monitor or screen. The ability to concurrently display or have readily available a multiplicity of windows continues to increase in popularity. A window is a visual area of a graphic user interface, and is typically represented as two-dimensional rectangular shapes. Interaction with a window is accomplished via a user input device, such as a mouse or trackball that controls a graphically displayed pointer or cursor upon the display, a keyboard, and/or a touch screen.

A workspace window is one in which documents may be displayed and/or accessed. For example, a drawing document associated with drawing or graphics application may be accessed in a workspace window. Multiple workspace windows may be concurrently displayed upon a given monitor. Operating systems commonly support multiple concurrent instances of workspace windows associated with the same or different applications. A window manager is computer software that controls the placement, appearance and interaction with windows displayed in a graphic user interface. The operating system and each application would have their own window managers.

An active window is one which is the currently focused window or otherwise currently selected to receive input. At any given time, only a single workspace window may be "active." Different window managers indicate the currently-active window in different ways and allow the user to switch between windows in different ways.

For example, using the mouse to maneuver a mouse cursor over a portion of a window while clicking a mouse button may cause that window to become active. Some window managers may make the window under the mouse cursor active without the need to click the mouse button. Window managers often provide a way to select the active window using the keyboard as an alternative to the mouse. Pressing the appropriate key combination typically cycles through all visible windows in some order, though other actions are possible. An active window may be indicated by having a different coloured or highlighted title bar or window frame. Many window managers provide a region of the screen containing some kind of visual control (often a button) for each window displayed on the screen. Each button typically contains the title of the window and may also contain a corresponding icon. This area of the screen generally provides some kind of visual indication of which window is active. For example, the active window's button may appear "pushed in." It is also usually possible to switch the active window by clicking on an appropriate button.

Typically, workspace windows may be moved or translated about the monitor. Such workspace windows may be overlapping or non-overlapping. Moreover, active windows may not always lie in front of all other windows on the display screen.

Within a given workspace window, there may be multiple "child windows." An instance of a graphics application may be launched which displays a workspace window. Within such workspace window (a "parent window") there may be displayed multiple documents each in its own child window. Each of the child windows may represent different documents, different portions of data associated with a common document (such as levels or layers of a drawing document), multiple instances of a same document, or multiple versions of the same document. A parent window would define a window frame and access to a variety of controls, such as toolbars, buttons, icons, menus, and the like. Such controls are applied to the various child windows within the associated parent window.

Child windows may be displayed in windows of various sizing relative to their associated parent window and/or other child windows. For example, child windows may be sized to fit the entirety of their common parent window. In such a case, the child windows would be overlapping. Visual indicators may be provided to represent the overlapped child window. For example, each child window may have a tab extending from its window frame with each child window's tab being offset from other tabs. Regardless of the order of overlap of the child windows, a visual indication would be displayed to provide user information as to the number, identity and/or order of the overlapped child windows. This may be referred to as a "tabbed view." This enables the child windows to be sized as large as possible (i.e., the extent of their parent window). Child windows may also be displayed in a partially overlapping manner. For example, each newly launched child window may be initially displayed with an offset (vertical and horizontal). This has the advantage of allowing a portion of each child window to be simultaneously displayed to provide the user with some information as to the contents of each of the child windows while also attempting to size the child windows as large as possible.

Another approach to displaying child windows is to launch non-overlapping windows. The maximum relative sizing of the child windows in this approach becomes significantly reduced in comparison to overlapping child windows. Child windows displayed in this approach may be referred to as a "window pane view," as this is similar to appearance of glass window panes.

The functionality of launching child windows or split views of a document or documents is particularly beneficial for viewing large format drawings. This is because a user may often need to view a drawing with a large zoom factor and the split feature allows several different parts of a drawing to be readily accessible.

Positional offset and scale are major parameters when displaying a document, such as a drawing document. It should also be noted that page number and rotation may also be significant as well. It is important to make a distinction between a document coordinate system and a screen or window coordinate system. A document coordinate system represents the physical size of the document independent of how the document is displayed in a window. The fundamental unit corresponds to a real measurement, such as inches or centimeters. The physical size of the documents would be defined by length and width dimensions or by coordinates of its four vertex points. The screen coordinate system represents how the document is displayed and its fundamental unit is associated with the screen display, such as pixels.

The positional offset parameter relates to the coordinate system of the displayed document in comparison to that of the actual document. The origin point for an actual document is typically initialized as being the upper left corner having zero X (horizontal) and zero Y (vertical) coordinates (e.g., (0, 0)). The origin of the display may be the upper left corner of the display. The origin point for display of the document may not be the same as that of the actual document. For example, the document may be displayed such that the upper left corner of the document (the origin of the actual document) is not even displayed. The display of the document may be changed by panning the view of the document. For example, the view of the document may be panned horizontally to the right with the origin point of the actual document translating to the left relative to the display. The X coordinate of the offset would become increasingly negative as the display of the document is further panned to the right.

The scale parameter pertains to the zoom factor of the displayed document. Typically a one hundred percent scale factor (100% or 1:1) results in a document being displayed on the screen that is generally near the actual sizing of the document. An increase in the scale such as 2:1 would result in the displayed document appearing twice the actual size (i.e., zoomed in). The zoom and offset parameters can be used to convert points between the drawing coordinate system and the screen coordinate system. The scale parameter may take into account the application level and/or the operating system level in relation to the screen display density.

In view of the ever increasing interest and utilization in the viewing and displaying of a document or multiple documents, there is a need in the art for an improved system for interacting with multiple displayed documents.

BRIEF SUMMARY

There is provided a method of synchronizing multiple views of multiple displayed documents. The method includes displaying a first document in a first viewing window. The method includes displaying a second document in a second viewing window. The method includes determining from the viewing windows an active window. The method includes determining for the active window a scale value and an offset value associated with the display of the associated one of the documents. The method includes redisplaying each document associated with the viewing window that is not the active window by using the determined scale and offset values.

According to various embodiments, the first and second viewing windows may be within a single workspace window. Alternatively, the first and second viewing windows may be within separate workspace windows. Further, the first and second workspace windows may be displayed on separate computer monitors. The method may further include displaying a third document in a third viewing window. The method may include determining for the active window a rotation value associated with the display of the associated one of the documents, and redisplaying each document associated with the viewing window that is not the active window by using the determined rotation value. The method may include receiving from the user an updated scale value for the first viewing window, and redisplaying the first document in a first viewing window with the updated scale value, redisplaying each document associated with the viewing window that is not the active window by using the updated scale value. The method may include receiving from the user an updated offset value for the first viewing window, redisplaying the first document in a first viewing window with the updated offset value, and redisplaying each document associated with the viewing window that is not the active window by using the updated offset value. The method may include determining for each viewing window a reference offset value and a reference zoom value, and the displaying of the first and second documents includes displaying the first and second documents using the reference offset and zoom values. The redisplaying of each document includes using the determined reference offset and zoom values. The first viewing window may have a first window frame dimension, the second viewing window has a second window frame dimension, and the first and second window frame dimensions may be the same. The first viewing window may have a first window frame dimension and the second viewing window may have a second window frame dimension with the first and second window frame dimensions being different.

According to another aspect of the present invention, there is provided a method of synchronizing multiple views of multiple displayed documents. The method includes displaying a first document in a first viewing window. The method includes displaying a second document in a second viewing window. The first and second windows are in separate workspace windows. The method includes determining from the viewing windows an active window. The method includes determining for the active window a scale value and an offset value associated with the display of the associated one of the documents. The method includes redisplaying each document associated with the viewing window that is not the active window by using the determined scale and offset values. The first and second viewing windows may be displayed on separate computer monitors.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
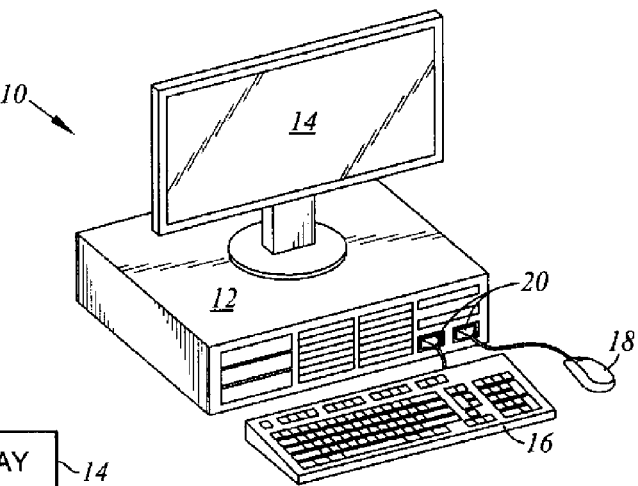
FIG. 1 is a perspective view of an exemplary computer system that may be capable to perform functions for use with aspects of the present invention including a display monitor.

With reference to FIG. 1, an exemplary hardware environment in which aspects of the present invention may be implemented includes a computer system 10 with a system unit 12 and a display unit 14. The display monitor 14 graphically displays output from the data processing operations performed by the system unit 12. The display monitor 14 is a visual output device and includes some form of screen. The display monitor 14 may be of a Liquid Crystal Display (LCD) type, a Cathode Ray Tube (CRT) type, or any other suitable type of display. Devices such as a keyboard 16 and a mouse 18 provide input to the data processing operations, and are connected to the system unit 12 via a USB port 20. Various other input and output devices may be connected to the system unit 12, and alternative interconnection modalities may be substituted with the USB port 20.

Figure 2:
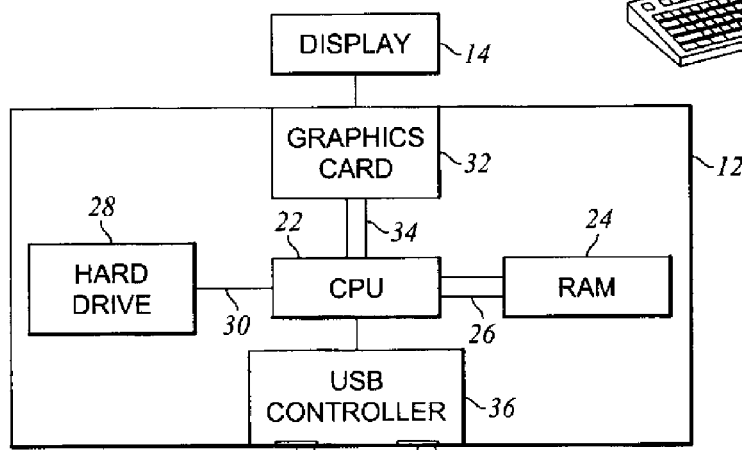
FIG. 2 is a block diagram of system components of the exemplary computer system of FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 26. The system unit 10 may also include permanent storage devices such as a hard drive 28, which are also in communication with the CPU 22 over an i/o bus 30. Other types of storage devices such as tape drives, Compact Disc drives, and the like may also be connected. A graphics card 32 is also connected to the CPU 22 via a video bus 34, and transmits signals representative of display data to the display monitor 14. As indicated above, the keyboard 16 and the mouse 18 are connected to the system unit 12 over the USB port 20. A USB controller 36 translates data and instructions to and from the CPU 22 for external peripherals connected to the USB port 20. Additional devices such as printers, microphones, speakers, and the like may be connected to the system unit 12.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display monitor 14. Generally, the operating system and the computer programs are tangibly embodied in a computer-readable medium, e.g. one or more of the fixed and/or removable data storage devices including the hard drive 28. Both the operating system and the computer programs may be loaded from the aforementioned data storage devices into the RAM 24 for execution by the CPU 22. The computer programs may comprise instructions which, when read and executed by the CPU 22, cause the same to perform the steps to execute the steps or features of the present invention.

The foregoing computer system 10 represents only one exemplary apparatus suitable for implementing aspects of the present invention. As such, the computer system 10 may have many different configurations and architectures. Any such configuration or architecture may be readily substituted without departing from the scope of the present invention.

Figure 3:
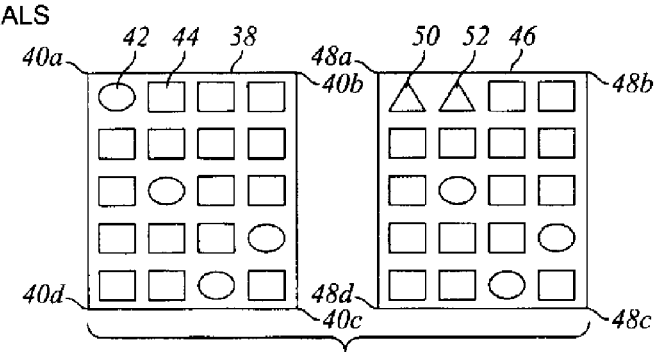
FIG. 3 is a plan view of exemplary first and second documents.

Referring now to FIG. 3, there is depicted an exemplary first document 38. The exemplary first document 38 may be graphically represented via the computer system 10. The first document 38 is symbolic in nature and represents any document or computer file that may be displayed at a graphic user interface such as the display monitor 14. The first document 38 may be based upon graphic, drawing, data, or word processing files for example, and may be stored in any number of formats in computer memory, such as in the hard drive 28 and/or RAM 24. The first document 38 of the embodiment illustrated is of a general rectangular configuration and is defined by four vertices 40a-d. The document 38 may include various data objects, such as the data objects 42, 44, respectively represented as an oval shape and a rectangle shape. Such data objects may be any graphical object, text or symbols. The first document 38 also includes a background. Moreover, the first document 38 may include layers or levels of data objects. It is contemplated that the document 38 may be manipulated, viewed and/or edited via a computer application implemented by the computer system 10 in accordance with those techniques and methods which are well known to one of ordinary skill in the art.

In FIG. 3 there is also depicted an exemplary second document 46 that may also be graphically represented via the computer system 10 and displayed at a graphic user interface such as the display monitor 14. The second document 46 of the embodiment illustrated is of a general rectangular configuration and is defined by four vertices 48a-d. The document 46 may include various data objects, such as the data object 42, 44, respectively represented as triangle shapes. It is contemplated that the first and second documents 38, 46 may be versions or drafts of a same document or completely different documents with completely different content and or formatting. Moreover, while the first and second documents 38, 46 of the embodiment depicts have the same document dimension, the document dimension may be different as well.

Figure 4:
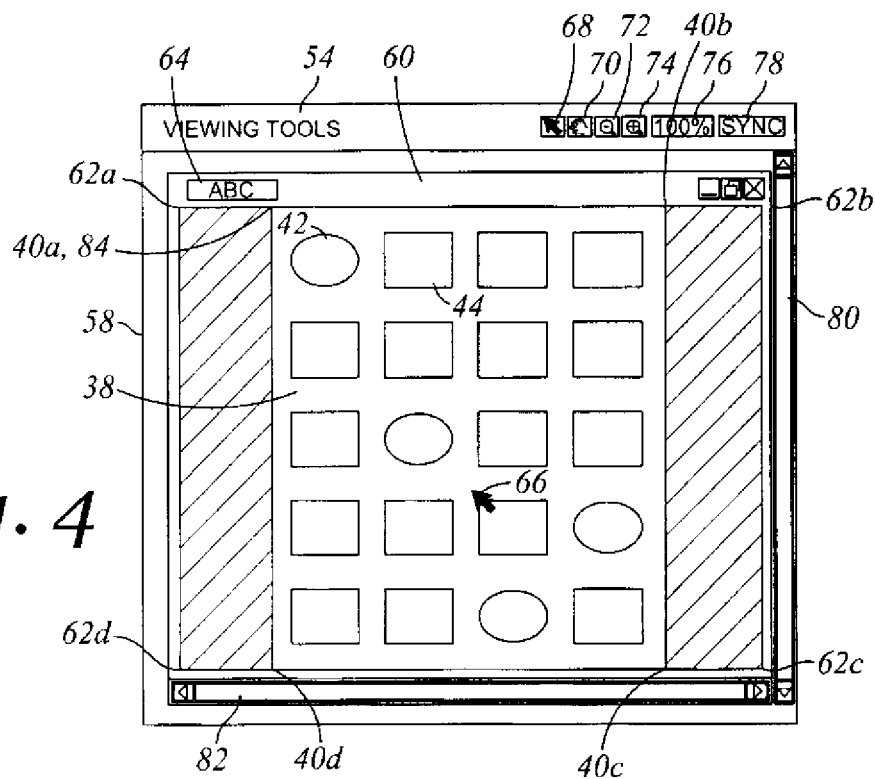
FIG. 4 is a plan view of a workspace window with a first viewing window displaying the first document at a first offset value and first scale value and a cursor.

Referring additionally to FIG. 4 there is depicted a workspace window 54 that may be displayed upon the display monitor 14. The workspace window 54 may be launched and controlled by an application residing in computer memory of the computer system 10. The first document 38 is displayed within the workspace window 54. More specifically the workspace window 54 includes a first viewing window 60 in which the first document 38 is displayed. The workspace window 54 includes a workspace window frame 56 that has a periphery 58 that surrounds the first viewing window 60. The first viewing window 60 includes first viewing window vertices 62a-d that generally define the display dimensions of the first viewing window 60. A tab 64 may be used to identify the document and/or the instance of the document being displayed within the first viewing window 60 and may include identifying indicia (sample indicia of "ABC" is indicated).

With regard to the specific interaction between a user and the computer system 10, a cursor 66 is directed via the mouse 18 to locations within the display monitor 14. The mouse 36 may include one or more mouse buttons. The application defines a number of interactive elements which may be visually connected to the workspace window 54 or accessed via menus or pop-up menus for example. A data processing procedure may be initiated by the user activating such interactive elements through clicking the mouse buttons while the cursor 66 is positioned on or near the interactive element. Additionally, a key or keys on the keyboard 16 may be pressed to initiate a data processing procedure. It will also be understood by a person having ordinary skill in the art that while the following description of the invention refers to steps carried out in an exemplary computer system 10, any other data processing device having similar functionality may be used without departing from the scope of the invention. Moreover, while the following description of the invention refers to "clicking" a mouse button, "positioning" a cursor 36 within the monitor 14, "selecting" using the cursor 36 and so forth, a person having ordinary skill in the art will recognize these terms to refer to any similar user interaction with the computer system 10 through a graphical user interface.

In the embodiment illustrated, the workspace window 54 includes interactive elements in a toolbar that has various example viewing tools. As will be discussed in further detail, the viewing tools include a cursor icon 68, a translation icon 70, a demagnify icon 72, a magnify icon 74, a scale icon 76, and a sync icon 78. In addition, the first viewing window 60 may include vertical and horizontal scrollbars 80, 82 that may be configured to visually represent the relative position and amount of the first document 38 presently being displayed in the first viewing window 60.

Figure 9:
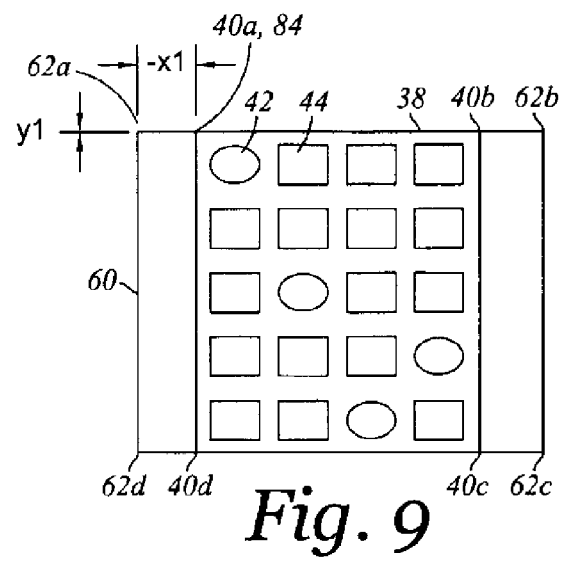
FIG. 9 is a symbolic view of the first document and the first viewing window of FIG. 4.

The first document 38 is displayed in the first viewing window 60 using a first origin coordinate 84. Referring now to FIG. 9 there is depicted a symbolic view of the first document 38 and the first viewing window 60 of FIG. 4. In this particular embodiment, the first origin coordinate 84 coincides with the vertex 40a (i.e., this is the upper left corner of the first document 38). The first document 38 may be displayed in the first viewing window 60 through the use of the first origin coordinate 84 in relation to the vertex 62a of the first viewing window 60. In this example, the first origin coordinate 84 is offset from the vertex 62a by a horizontal value of "−x1" and a vertical value of "y1" that is equal to zero offset. In this regard, a first offset value of the first document 38 as displayed in the first viewing window 60.

Figure 5:
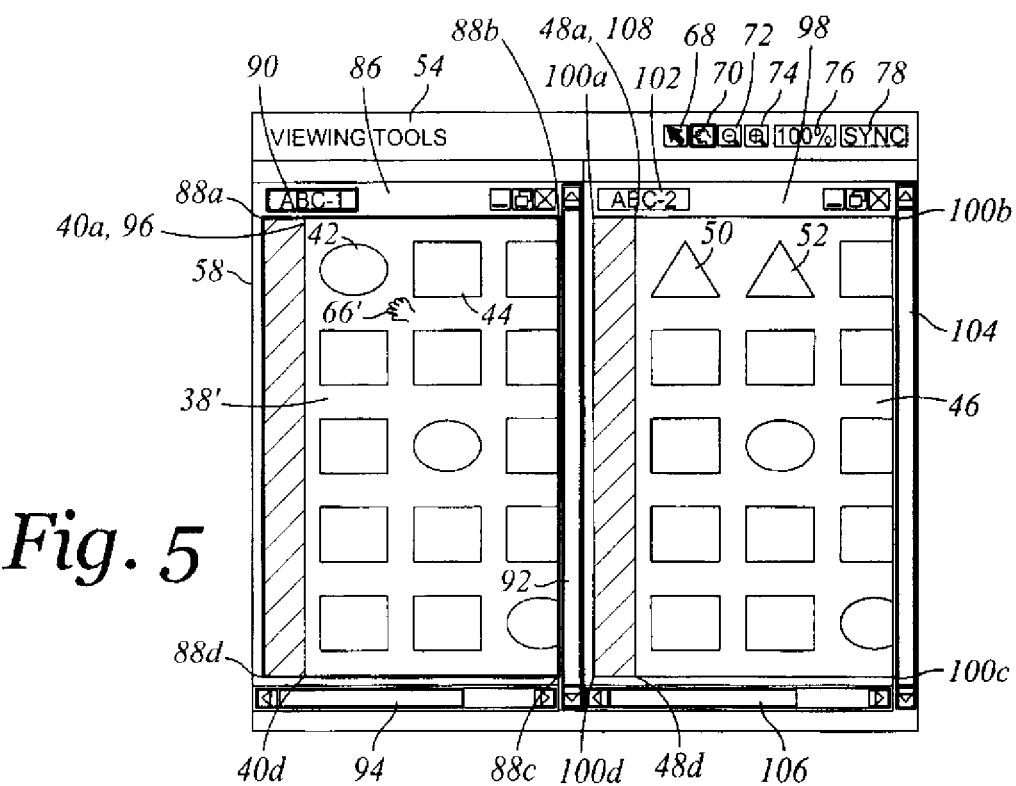
FIG. 5 is the view of the workspace window of FIG. 4 with a second viewing window displaying the first document and a second viewing window displaying the second document.

It is contemplated that the user may initiate the application to display the second document 46. In the particular embodiment depicted, the second document 46 is launched in the first workspace window 54. Referring now to FIG. 5 there is depicted the workspace window 54. The application may be configured to launch the second document 46 by launching second and third viewing windows 86, 98. The first document (denoted as 38') is displayed in the second viewing window 86 and the second document 46 is displayed in the third viewing window 98. The first document 38' is denoted with the "'" as this indicates it is displayed in a different viewing state that as previous displayed in FIG. 4. These views may be considered a "split" view as the first viewing window 58 is split into the second and third viewing windows 86, 98 with the second and third viewing windows 86, 98 cumulatively overlaying the footprint of the first viewing window 58. The second and third viewing windows 86, 98 each has frame dimensions that are generally the same as each other and each has a footprint of approximately half of the first viewing window 50 within the workspace window 48. Thus, the first and second viewing windows 86, 98 each have window frame dimensions that fit within the first window frame dimension of the first window frame 50. This may also be referred to as a "tile" or "pane" view with second and third viewing windows 86, 98 having an appearance of side-by-side tiles or panes. It is contemplated that the second and third viewing windows 86, 98 may be launched in other viewing arrangements. For example, in a "tabbed" view with the second and third viewing windows 86, 98 being alternatively viewable in an overlapping footprint upon the display monitor 14. In addition, the second and third viewing windows 86, 98 may be launched in separate workspace windows.

Though not shown, it is contemplated that additional viewing windows may be displayed in the workspace window 54. For example a dozen viewing windows may be displayed. This may be in a split view or other viewing arrangement. In addition, each split view may include tabbed views of other viewing windows located at each split view footprint. This may be particular useful where there are multiple drafts or revisions of a parent document and each document may have different layers, types of data, or by page number for example.

The first document 38' is displayed in the second viewing window 86 using the first scale value. The application may initially determine a correlation between the actual sizing of the first document 38 and its scaled size. For example, a standard letter size of 8.5 inches by 11 inches may correlate to a generally similar size when viewed on a display screen, such as the display monitor 14. The scale icon 76 may be used to indicate the displayed scale value of the active window.

In FIG. 5, the active window is the second viewing window 50 and the first scale value is indicated by the scale icon 76 as being 100%. It is understood that the scale values are relative terms related to the display of documents in relation to an initial reference scale value between the document coordinate system and the viewing window coordinate system. This is in contrast to a scale factor associated with content of the documents themselves. For example two documents may be of the same physical size, but the contents of one document may be scaled relative to the contents of the other document. In the case of an architectural drawing, the contents of a first document may be scaled such that 1 inch correlates to 1 foot in the drawing in the first document, and the contents of a second document may be scaled such that 1 inch correlates to 2 feet in a drawing in the second document. In such a case the relative scale factor between the first and second documents would be 2:1. It is contemplated that the application may be configured to receive document scale factor data so as to display documents at scales values using such relative scale factors.

The second viewing window 86 is defined by vertices 88a-d. A tab 90 may be used to identify the displayed contents of the second viewing window 86. In this example, the tab 90 indicates "ABC-1" which may be used to signify to the user that the document 38' is being displayed, however, in another view than previously displayed in the first viewing window 60.

The second viewing window 86 may include vertical and horizontal scroll bars 92, 94. The vertical and horizontal scroll bars 92, 94 may be used to indicate the displayed portions of the document 38 in comparison to the non-displayed portions. In this regard, the vertical scroll bar 92 is filled with a solid bar so as to indicate that the vertical dimension of the document 38 "fits" and is completely displayed within the vertical dimension of the second viewing window 86. The horizontal scroll bar 94 is partially filled with a solid bar so as to indicate that the horizontal dimension of the first document 38' does not completely fit within the horizontal dimension of the second viewing window 86 as it is only partially displayed. Thus, the left portion of the first document 38' is displayed in the second viewing window 86. The application may be configured to display the first document 38' in the second viewing window 86 in a manner that generally related to the previous view in the originating first viewing window 60. In this regard, the second viewing window 86 includes a second origin coordinate 96 that corresponds to the vertex 40a of the first viewing window. A second offset value may be determined for the display of the first document 38' in the second viewing window 86 that defines the relative position of the first document 38' in relation to the second viewing window 86. This may be calculated by the application using the second origin coordinate 96 and the vertex 40a. The application may further be configured to display the first document 38' with a same scale value (i.e., the first scale value) of the first document 38 as previously used to the display the first document 38 in the first viewing window 60. It is understood, that other displayed offsets positions of the first document 38' in the second viewing window 60 and other scale values may be utilized in other embodiments.

Figure 10:
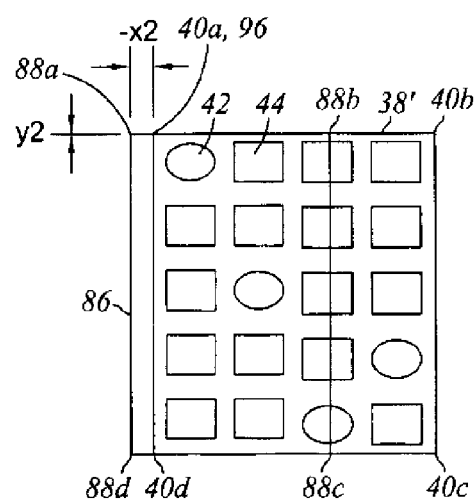
FIG. 10 is a symbolic view of the first document and the second viewing window of FIG. 5.

Referring now to FIG. 10 there is depicted a symbolic view of the first document 38' and the second viewing window 86 of FIG. 5. In this particular embodiment in relation to the coordinate system of the second viewing window 86, a second origin coordinate 96 coincides with the vertex 40a (i.e., this is the upper left corner of the first document 38'). The first document 38' may be displayed in the second viewing window 86 through the use of the second origin coordinate 96 in relation to the vertex 88a of the second viewing window 86. In this example, the second origin coordinate 96 is offset from the vertex 88a by a horizontal value of "−x2" and a vertical value of "y2" that is equal to zero offset. It is noted that the positive and negative connotations of the coordinates and offset values are by way of example only. Actual programming techniques may implement other coordinate systems.

The third viewing window 98 is defined by vertices 100a-d. A tab 102 may be used to identify the displayed contents of the third viewing window 100. In this example, the tab 102 indicates "ABC-2" which may be used to signify to the user the second document 46. The third viewing window 98 may include vertical and horizontal scroll bars 104, 106. The vertical and horizontal scroll bars 104, 106 may be used to indicate the displayed portions of the document 46' in comparison to the non-displayed portions. The application may be configured to display newly launched document 46 in the third viewing window 86 in a manner that uses the second offset and first scale values of the displayed first document 38 in the first viewing window 50 that originated the split view.

Figure 11:
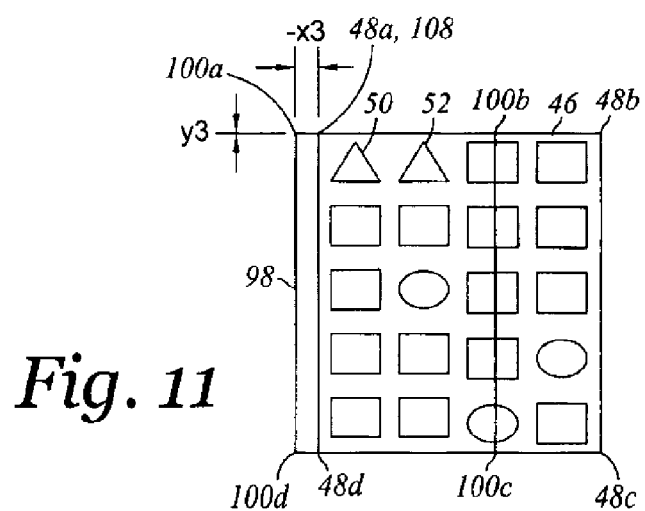
FIG. 11 is a symbolic view of the second document and the third viewing window of FIG. 5.

Referring additionally now to FIG. 11 there is depicted a symbolic view of the second document 46 and the third viewing window 98 of FIG. 5. In this particular embodiment in relation to the coordinate system of the third viewing window 98, a third origin coordinate 108 coincides with the vertex 48a (i.e., this is the upper left corner of the second document 46). The second document 46 may be displayed in the third viewing window 98 through the use of the third origin coordinate 108 in relation to the vertex 100a. In this example, the third origin coordinate 108 is offset from the vertex 100a by a horizontal value of "−x3" and a vertical value of "y3" that is equal to zero. The third origin coordinate 108 has the second offset values in relation to the vertex 100a. This is because the application of this embodiment is configured to launch both the second and third viewing windows 86, 98 in a manner that respectively displays the first and second documents 38', 46 with the same offset values.

FIG. 5 depicts the translation icon 70 as being highlighted indicating it having been selected by the user. In this regard, a cursor 66' may replace the cursor 66. The cursor 66' is visually different from the cursor 66. In this embodiment, the cursor 66' has the appearance of a person's hand. The activation of the translation icon 70 visually changes the appearance of the cursor 66 to the cursor 66.' This provides the user with a visual indicator indicating to the user that the tool has been selected and that the functionality associated with the mouse control and cursor 66' is different that the cursor 66. In this embodiment the user may "click" on the first document 38' with the cursor 66' overlying the first document 38. Subsequently, movement of the cursor 66' translates ("drags") the first document 38' within the second viewing window 86. The application may be configured to decouple the cursor 66' from the first document 38' to cease the coordinated movement ("dragging") of the cursor 66' and the first document 38'. In other embodiments such translation may be achieved by other methods, such as by the holding down of a mouse button while dragging a clicked document or through the use of the keyboard 16, for examples.

Figure 6:
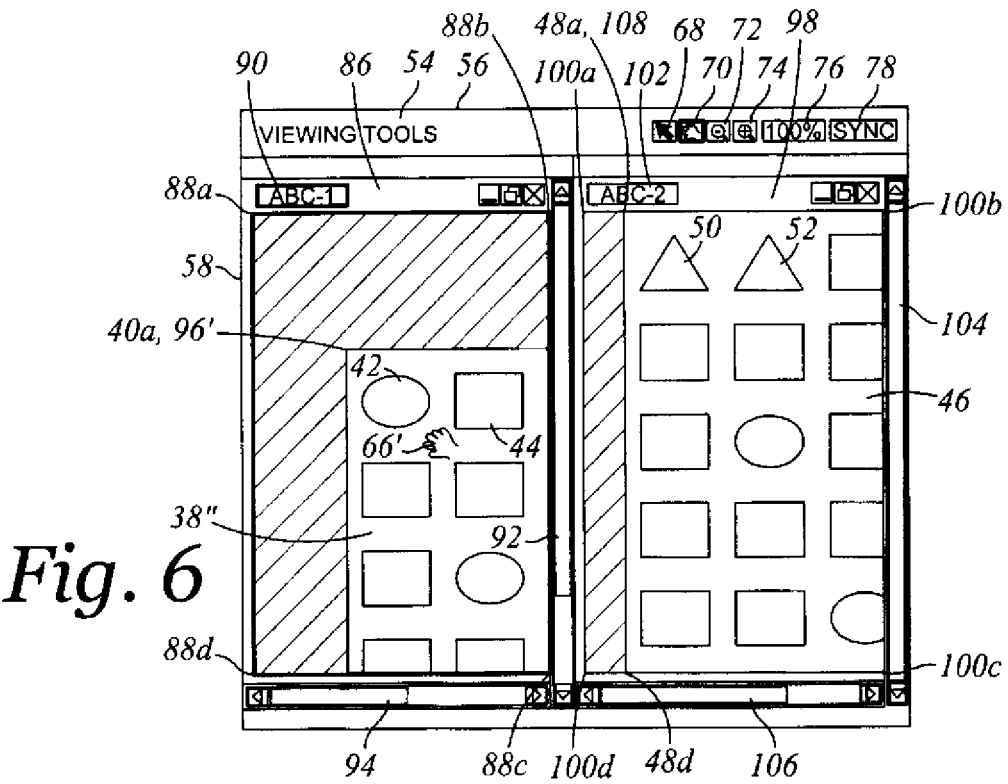
FIG. 6 is the view of the workspace window of FIG. 5 with the first document translated to a second offset value in the second viewing window.

Referring now to FIG. 6 there is depicted a view of the workspace window 54 of FIG. 5 with the first document 38' translated in comparison to its position in FIG. 5. The first document (denoted as 38") is displayed in the second viewing window 86. The first document 38" is denoted with the "'"" as this indicates it is displayed in a different viewing state than as previously displayed in FIG. 5. As is depicted the first document 38" is translated down and to the right. This correlates to the user having navigated the cursor 66' down and to the right after clicking on the first document 38' as was depicted in FIG. 5. Having translated that first document 38" to a desired position in the second viewing window 86 the user may unclick the mouse button of the mouse 18 so as to decouple the continued dragging of the first document 38" upon further movement of the cursor 66'.

Figure 12:
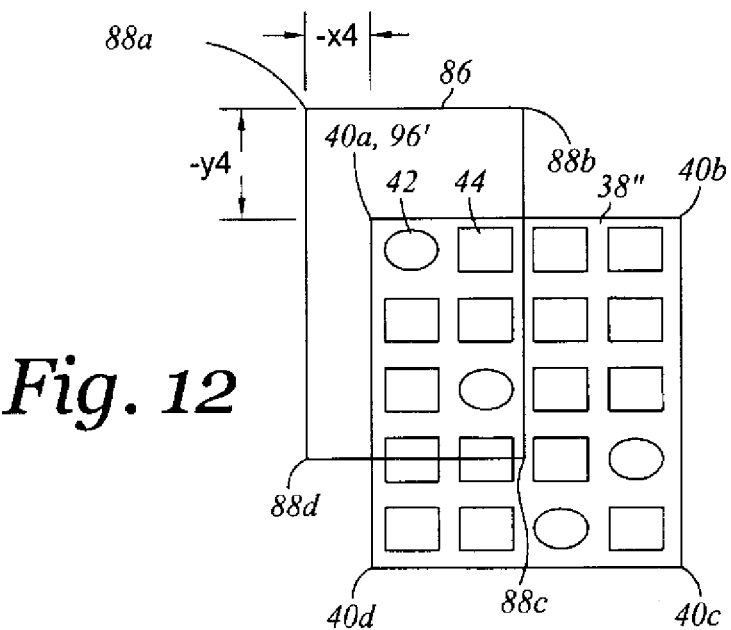
FIG. 12 is a symbolic view of the first document and the second viewing window of FIG. 6.

Referring additionally to FIG. 12 there is depicted a symbolic view of the first document 38" and the second viewing window 86 of FIG. 6. In this particular embodiment in relation to the coordinate system of the second viewing window 86, a second origin coordinate 96' coincides with the vertex 40a (i.e., this is the upper left corner of the first document 38"). The first document 38" may be displayed in the second viewing window 86 through the use of the second origin coordinate 96' in relation to the vertex 88a of the second viewing window 86. In this example, the second origin coordinate 96' is offset from the vertex 88a by a horizontal value of "−x4" and a vertical value of "−y4." In relation to FIGS. 6 and 12, a third offset value may be determined for the display of the first document 38" in the second viewing window 86 that defines the relative position of the first document 38" in relation to the second viewing window 86. This may be calculated by the application using the second origin coordinate 96' and the vertex 40a.

Figure 7:
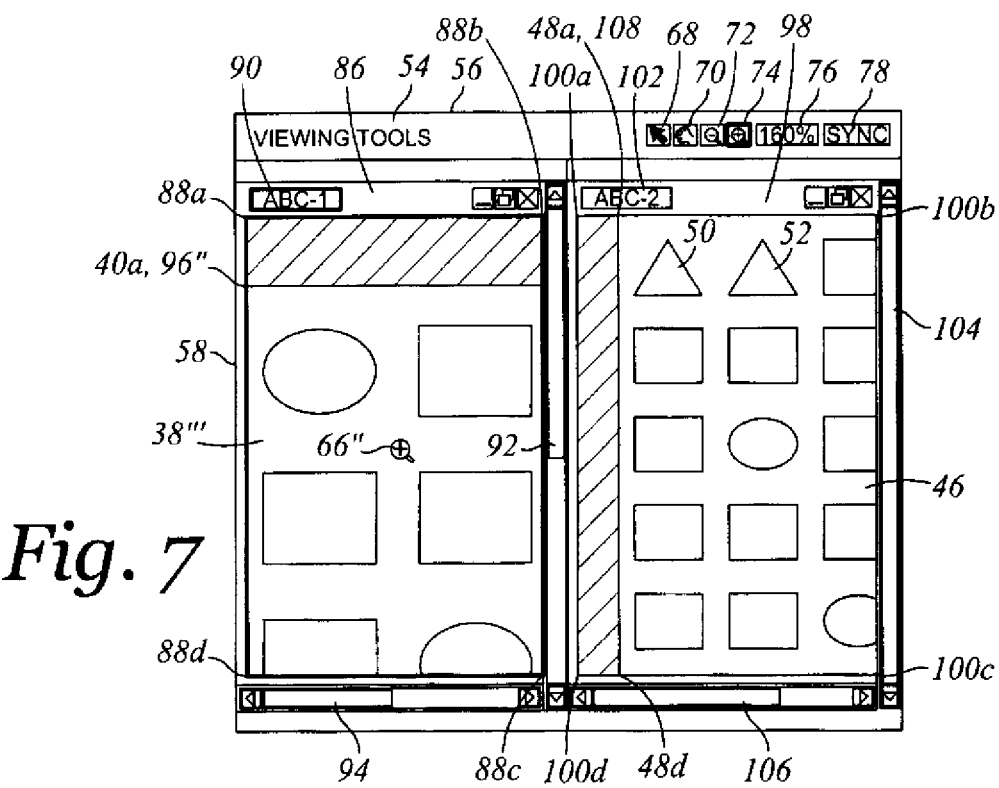
FIG. 7 is the view of the workspace window of FIG. 6 with the first document displayed at a second scale value greater than the first scale value.

Referring now to FIG. 7 there is depicted a view of the workspace window 54 of FIG. 6 with the first document (denoted as 38''') displayed in the second viewing window 86. The first document 38''' is denoted with the "'''" as this indicates it is displayed in a different viewing state than as previously displayed in FIG. 6. The first document 38''' has a scale value greater than the scale value associated with the first document 38'' of FIG. 6. The scale icon 76 indicates "160%" which corresponds to the relatively increased scale value of the document 38'''.

FIG. 7 depicts the magnify icon 74 as being highlighted indicating it having been selected by the user. In this regard, a cursor 66'' may replace the cursor 66'. The cursor 66'' is visually different from the cursor 66' and the cursor 66. In this embodiment, the cursor 66'' has the appearance of a magnifying glass with a plus symbol. The activation of the magnify icon 74 visually changes the appearance of the cursor 66' to the cursor 66''. This provides the user with a visual indicator indicating to the user that the tool has been selected and that the functionality associated with the mouse control and cursor 66'' is different than the cursor 66'. In this embodiment the user may "click" on the first document 38'' with the cursor 66'' overlying the first document 38'' as was displayed in FIG. 6 (this is not shown). Subsequently, the first document 38''' is displayed at an increased scale value, a second scale value, such as depicted in FIG. 7. Thus, the second scale value is greater than the first scale value. The application may be configured with the input of additional clicks resulting in an incremental increase of the scale value. This feature may be referred to as a "zoom" function. It is contemplated that the de-magnify icon 72 may be utilized in a similar manner so as to decrease the scale value to perform a "zoom out" function. In other embodiments such zooming may be achieved by other methods, such as by numerical input or through the use of pull down menus, for examples.

Figure 13:
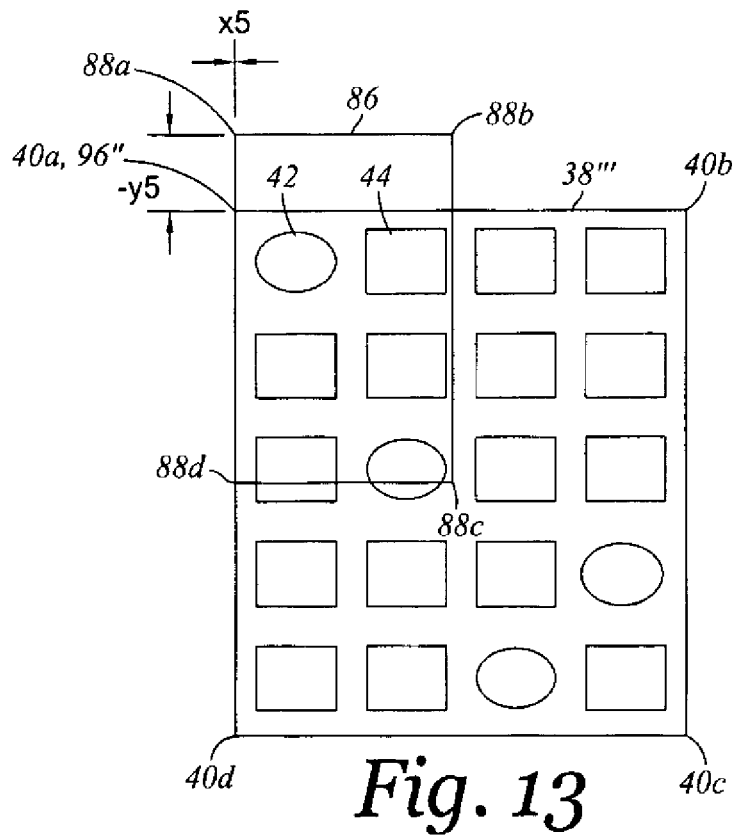
FIG. 13 is a symbolic view of the first document and the second viewing window of FIG. 7.

Referring additionally to FIG. 13, there is depicted a symbolic view of the document 38''' and the second viewing window 86 of FIG. 7. In this particular embodiment in relation to the coordinate system of the second viewing window 86, a second origin coordinate 96'' coincides with the vertex 40a (i.e., this is the upper left corner of the document 38'''). The document 38''' may be displayed in the second viewing window 86 through the use of the second origin coordinate 96'' in relation to the vertex 88a of the second viewing window 86. In this example, the second origin coordinate 96'' is offset from the vertex 88a by a horizontal value of "x5" equal to zero and a vertical value of "−y5." In relation to FIGS. 7 and 13, a fourth offset value may be determined for the display of the first document 38''' in the second viewing window 86 that defines the relative position of the first document 38''' in relation to the second viewing window 86. This may be calculated by the application using the second origin coordinate 96'' and the vertex 40a.

Figure 8:
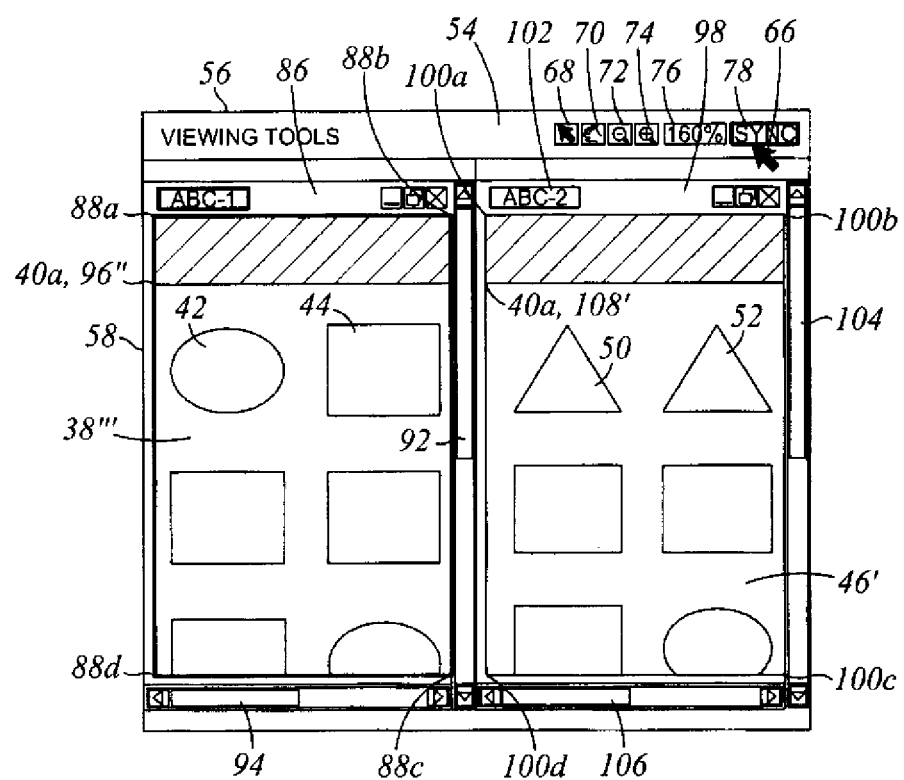
FIG. 8 is the view of the workspace window of FIG. 7 with the second document displayed the third viewing window with the second offset value and the second scale value.

Referring now to FIG. 8 there is depicted a view of the workspace window 54 of FIG. 7 with the second document (denoted as 46') displayed in the third viewing window 98. The second document 46' is denoted with the "'" as this indicates it is displayed in a different viewing state that as previous displayed in FIG. 7. The second document 46' has an offset value and a scale value the same as that associated with the first document 38''' of FIG. 7. In this regards, the second document 46' has a third origin coordinate (denoted 108') as displayed in the third viewing window 98. FIG. 8 depicts the sync icon 78 as being highlighted indicating it having been selected by the user. In this embodiment the activation of the sync icon 78 results in the redisplay of any other document in other viewing windows with the offset and scale values of the document currently displayed in the active viewing window. In FIG. 8, the active window is the second viewing window 58. The second viewing window 58 displays the first document 38''' with the fourth offset value and the second scale value. In this regard, the third viewing window 98 (a non-active window) displays the second document 46' with the fourth offset value and the second scale value. As such, the display of the second document 46' is synchronized ("synched") to the active widow through the initiation of the "sync" function activated by the sync icon 78.

Figure 14:
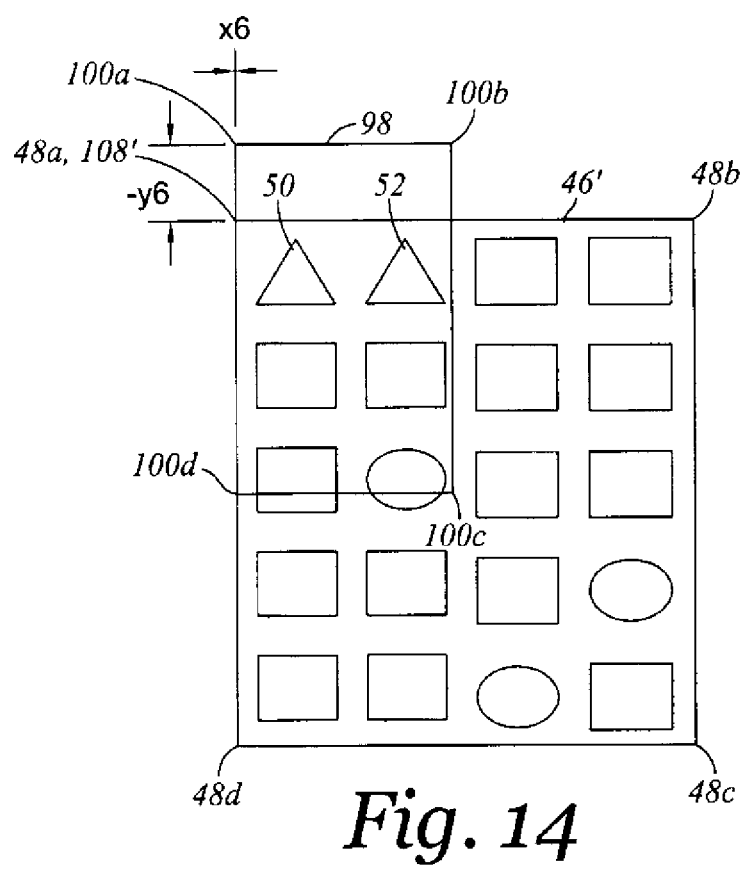
FIG. 14 is a symbolic view of the second document and the third viewing window of FIG. 8.

Referring additionally now to FIG. 14 there is depicted a symbolic view of the second document 46' and the third viewing window 98 of FIG. 8. In this particular embodiment in relation to the coordinate system of the third viewing window 98, the third origin coordinate 108' coincides with the vertex 48a (i.e., this is the upper left corner of the second document 46'). The second document 46' may be displayed in the third viewing window 98 through the use of the third origin coordinate 108' in relation to the vertex 100a. In this example, the third origin coordinate 108' is offset from the vertex 100a by a horizontal value of "x6" equal to zero and a vertical value of "−y6."

It is contemplated that the "sync" function may be left "on." In this regard, the offset and scale values of the first document 38''' may be subsequently changed and the non-active windows (the third viewing window 98) would continue to "sync" their displayed documents (e.g., the second document 46'). The application can be configured to only redisplay the documents in the non-active window once the user is finished with a translation function and has decoupled the associated cursor 66'. This would conserve computing resources and allow the user to view the other documents and their relative offset positioning while repositioning the document in the active window.

According to an aspect of the present invention there is provided a method of synchronizing multiple views of multiple displayed documents, such as the first and second documents 38, 46. The method includes displaying the first document 38 in a first viewing window, such as the second viewing window 86 of FIG. 7. The method further includes displaying the second document 46 in another viewing window, such as the third viewing window 98. The method further provides for determining from the viewing windows an active window. In the example of FIG. 7, the second viewing window 86 is the active window. Next, the method provides for determining for the active window a scale value and an offset value associated with the display of the associated one of the documents. Thus, the active window is the second viewing window 86 and it displays the first document 38''' with the fourth offset value and the second scale value. In addition, the method provides for redisplaying each document associated with the viewing window that is not the active window by using the determined scale and offset values. Referring to FIG. 8, the second document 46' is redisplayed in the third viewing window 98 (the non-active window) using the fourth offset value and the second scale value. As such, the non-active window is "synched" to the active window. Where additional non-active windows are present, the display of the documents in such non-active windows would be updated as well.

As used herein the term "offset value" (such as the first, second, third and fourth offset values) means that data used by a computer system to determine a relative positioning of a document in relation to a viewing window that displays the document. As such, the offset value may actual embody several data values (such as horizontal and vertical coordinates). Further, as used herein the term "scale value" (such as the first and second scale values) means that data used by a computer system to determine a viewing sizing of a document in relation to the coordinate system of the viewing window that displays the document. The scale value of the display does not refer to the scale value of the contents of the document itself.

Figure 15:
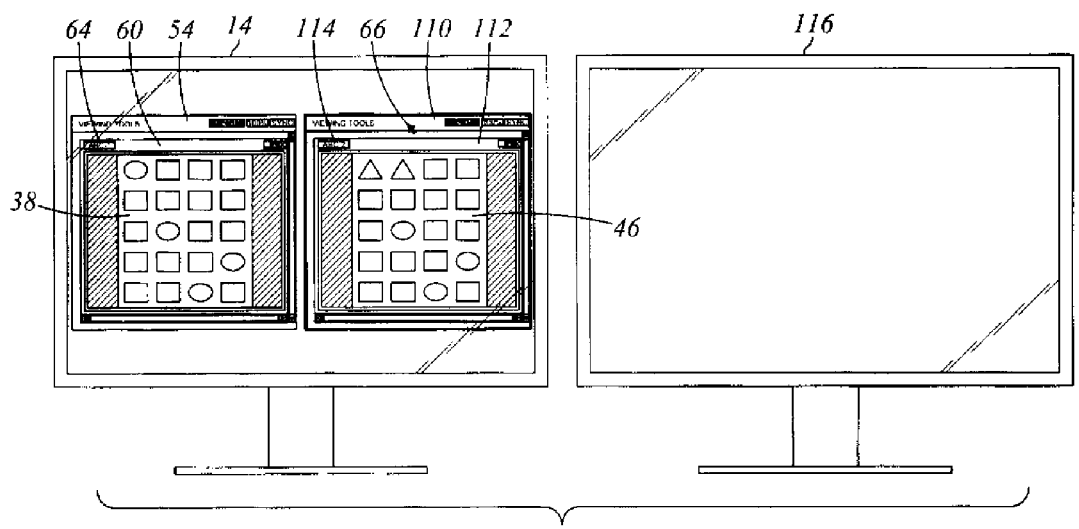
FIG. 15 is a plan view of the display monitor of FIG. 1 displaying a workspace window and the first viewing window displaying a first document and a second workspace window and a fourth viewing window displaying the second document, and a second display monitor.
Figure 16:
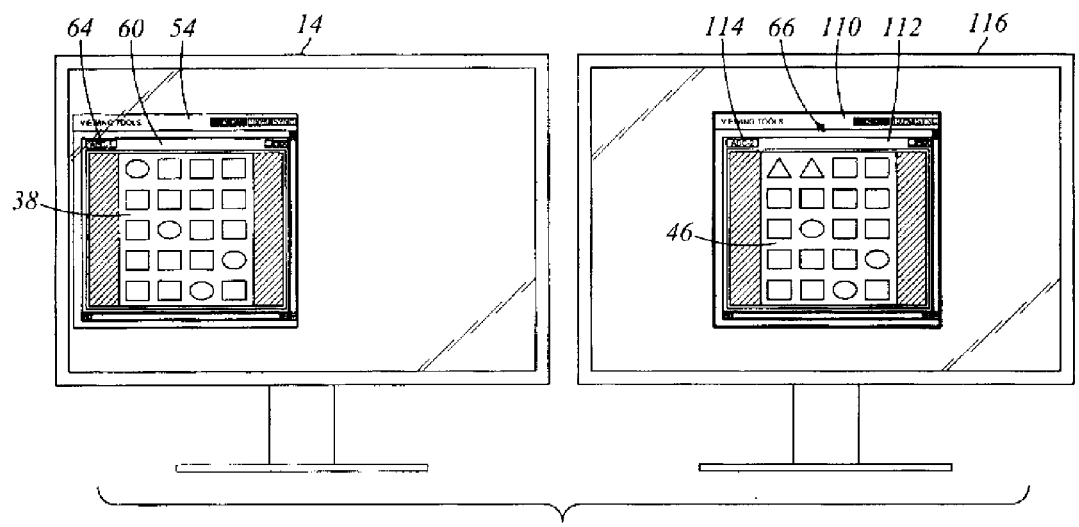
FIG. 16 is a plan view of the display monitors of FIG. 15, however with the second workspace window displayed on the second display monitor.

Referring now to FIGS. 15 and 16, there is depicted the display monitor 14 that displays the first workspace window 54. The first workspace window 54 is depicted as displaying the first document 38 such as is depicted in FIG. 4. In addition, the second document 46 is displayed in a second workspace window 110, and more specifically in a fourth viewing window 112. In addition, a second display monitor 116 is depicted along with the display monitor 14. The second display monitor 116 may be electrically connected to the system unit 12. In FIG. 15, the user may "grab" the second workspace window 110 using the cursor 66. FIG. 16 depicts the user having dragged the second workspace window 110 to the second display monitor 116. Thus, it is contemplated that the above described "sync" function of synchronizing non-active windows may be accomplished across workspace windows (such as between the first workspace window 54 and the second workspace window 110). This may be particularly useful where the user desires to size the viewing windows as large as possible with a viewing window expansively enlarged across each of the display monitors 14, 116.

It is contemplated that the application may be configured to receive page number data associated with the display of the documents. In this regard, the method may additionally include determining a displayed page number for the active document and using such determined displayed page number when redisplaying the non-active window documents. Further, it is contemplated that the application may be configured to receive and/or determine rotational alignment offsets associated with each displayed document. Such rotational alignment offsets may be used when redisplaying the non-active window documents.

While the steps and the user inputs necessary to generate and modify the data objects and interact with application tools as discussed above have been detailed with reference to mouse inputs in specific sequences, alternative sequences may also be utilized. A person having ordinary skill in the art will recognize the above described sequences are the most commonly utilized in graphical computer applications, but there are other existing sequences that may be substituted without departing from the scope of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A method of synchronizing multiple views of multiple displayed documents on a computer display screen, the method comprising:
    displaying a first document in a first viewing window;
    displaying a second document in a second viewing window;
    determining from the viewing windows an active window;
    determining for the active window a scale value and an offset value associated with the display of the associated one of the documents as displayed within the active window based upon one or more features thereof; and
    redisplaying each document associated with the viewing window that is not the active window by using the determined scale and offset values to display each document within the viewing window.

2. The method of claim 1 wherein the first and second viewing windows are within a single workspace window.

3. The method of claim 1 wherein the first and second viewing windows are within separate workspace windows.

4. The method of claim 3 wherein the first and second workspace windows are displayed on separate computer monitors.

5. The method of claim 1 further includes determining for the active window a rotation value associated with the display of the associated one of the documents, redisplaying each document associated with the viewing window that is not the active window by using the determined rotation value.

6. The method of claim 1 further includes receiving from the user an updated scale value for the first viewing window, redisplaying the first document in a first viewing window with the updated scale value, redisplaying each document associated with the viewing window that is not the active window by using the updated scale value.

7. The method of claim 1 further includes receiving from the user an updated offset value for the first viewing window, redisplaying the first document in a first viewing window with the updated offset value, redisplaying each document associated with the viewing window that is not the active window by using the updated offset value.

8. The method of claim 1 includes determining for each viewing window a reference offset value and a reference zoom value, the displaying of the first and second documents includes displaying the first and second documents using the reference offset and scale values, the redisplaying of each document includes using the determined reference offset and scale values.

9. The method of claim 1 wherein the first viewing window has a first window frame dimension, the second viewing window has a second window frame dimension, the first and second window frame dimensions are the same.

10. A method of synchronizing multiple views of multiple displayed documents, the method comprising:
    displaying a first document in a first viewing window;
    displaying a second document in a second viewing window, the first and second viewing windows are in separate workspace windows;
    determining from the viewing windows an active window;
    determining for the active window a scale value and an offset value associated with the display of the associated one of the documents as displayed within the active window based upon one or more features thereof; and
    redisplaying each document associated with the viewing window that is not the active window by using the determined scale and offset values to display each document within the viewing window.

11. The method of claim 10 wherein the first and second workspace windows are displayed on separate computer monitors.

* * * * *